United States Patent
Yoakum et al.

(10) Patent No.: US 7,469,293 B1
(45) Date of Patent: Dec. 23, 2008

(54) USING ADDITIONAL INFORMATION PROVIDED IN SESSION REQUESTS

(75) Inventors: John H. Yoakum, Cary, NC (US); Philip Edholm, Pleasanton, CA (US)

(73) Assignee: Nortel Networks Limited, St. Laurent (CA)

( * ) Notice: Subject to any disclaimer, the term of this patent is extended or adjusted under 35 U.S.C. 154(b) by 1054 days.

(21) Appl. No.: 10/784,865

(22) Filed: Feb. 23, 2004

(51) Int. Cl.
*G06F 15/16* (2006.01)
*G06F 12/001* (2006.01)

(52) U.S. Cl. .................................. 709/227; 709/228
(58) Field of Classification Search ................ 709/227, 709/228, 217, 218, 250
See application file for complete search history.

(56) References Cited

U.S. PATENT DOCUMENTS

| | | | |
|---|---|---|---|
| 5,987,440 A | | 11/1999 | O'Neil et al. |
| 6,041,357 A | * | 3/2000 | Kunzelman et al. ......... 709/228 |
| 6,237,025 B1 | | 5/2001 | Ludwig et al. |
| 6,351,762 B1 | | 2/2002 | Ludwig et al. |
| 6,690,654 B2 | | 2/2004 | Elliott et al. |
| 6,892,307 B1 | | 5/2005 | Wood et al. |
| 6,985,961 B1 | | 1/2006 | Ramsayer et al. |
| 2002/0073210 A1 | | 6/2002 | Low et al. |
| 2003/0145054 A1 | * | 7/2003 | Dyke .......................... 709/205 |
| 2004/0068572 A1 | * | 4/2004 | Wu ............................. 709/229 |
| 2004/0123144 A1 | | 6/2004 | Chan et al. |
| 2006/0005237 A1 | | 1/2006 | Kobata et al. |

FOREIGN PATENT DOCUMENTS

EP      1041496      * 4/2000

* cited by examiner

*Primary Examiner*—Zarni Maung
(74) *Attorney, Agent, or Firm*—Withrow & Terranova, P.L.L.C.

(57) ABSTRACT

The present invention allows a communication client to receive a session request from a sending communication client, wherein the session request includes additional information. The additional information is processed to determine an action to take in association with the communication session to be established with the communication client. The additional information may include context indicia, which may identify an association related to the subject matter of the session, or a specific instruction to take the action in association with the communication session.

44 Claims, 4 Drawing Sheets

USING ADDITIONAL INFORMATION PROVIDED IN SESSION REQUESTS

CROSS-REFERENCE TO RELATED APPLICATIONS

The present application is related to concurrently filed U.S. application Ser. No. 10/784,864 entitled PROVIDING ADDITIONAL INFORMATION WITH SESSION REQUESTS, the disclosure of which is incorporated herein by reference in its entirety.

FIELD OF THE INVENTION

The present invention relates to communications, and in particular to providing additional information in a session request that may be used by a remote communication device or application.

BACKGROUND OF THE INVENTION

Various types of communication sessions, including those based on voice or messaging, are established because two or more parties desire to communicate about a particular subject. The subject of the communication may be of interest to additional parties and may be associated with any number of files, documents, and the like. For example, if a voice session is established between two parties to discuss a particular project defined in a document, one of the parties to the communication session may email the other party a copy of the document during the communication session, such that both of the parties may view the document during their discussions. Unfortunately, there is no easy or automated way for the parties to exchange documents, let alone determine which documents are related to their discussions. Further, if other parties should be involved in the session, there is no easy or automated way to determine these parties are interested in the discussion and provide these documents to the third parties. Accordingly, there is a need for a way to provide contextual information in association with establishing a communication session, such that related parties may participate in the session and related documents or information may be provided to the parties in an automated fashion, without requiring the parties to identify other parties to include in the communication session or separately provide documents and information in association with the communication session. There is also a need to provide instructions to a communication device with which a communication session is being established to take actions to enhance the communication session.

SUMMARY OF THE INVENTION

The present invention allows a communication client to receive a session request from a sending communication client, wherein the session request includes additional information. The additional information is processed to determine an action to take in association with the communication session to be established with the communication client. The additional information may include context indicia, which may identify an association related to the subject matter of the session, or a specific instruction to take the action in association with the communication session.

In one embodiment, the context indicia identifies an association of people, information, or things, which may take many forms. The association is related to the action to be taken. Although not inclusive, the actions to be taken may include providing information to a user, displaying information to a user, recording at least a portion of the communication session, storing information related to the communication session, initiating other sessions with other communication devices, restricting incoming session requests to those related to the existing communication session, obtaining information from a participant in the session, providing information to a participant in the session, accessing web sites, initiating emails, calls, or instant messages, and the like. Accordingly, information may be provided in session requests to cause the communication client receiving the session request to establish the session, as well as take additional actions related to the session or the subject matter to be addressed in the session.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
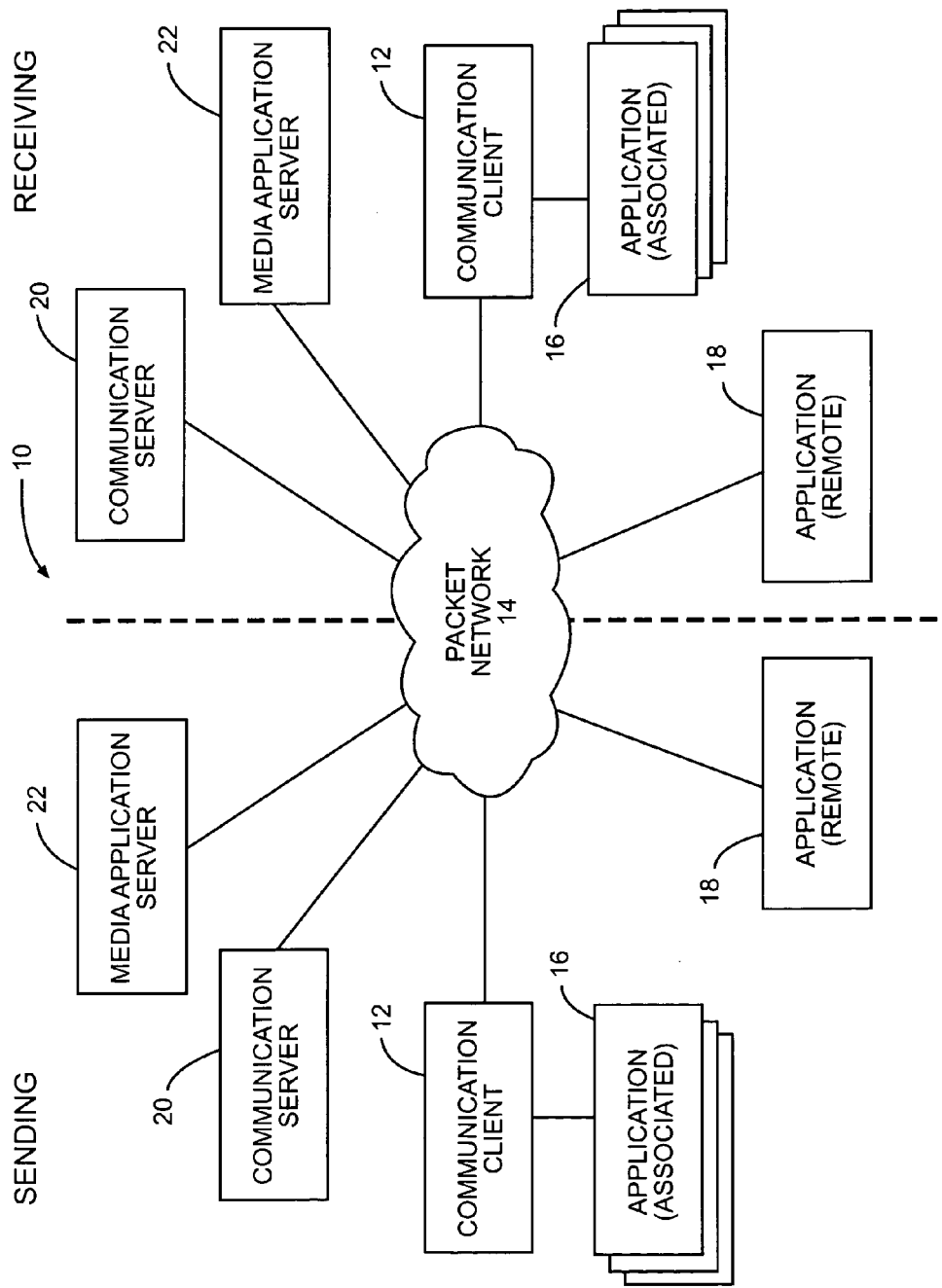
FIG. 1 is a block representation of a communication environment according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention allows a first communication client to include additional information in a session request, which is sent to a second communication client. The session request is intended to trigger a communication session between the first and second communication clients. The additional information provided in the session request by the first communication client is used by the second communication client to initiate an action. The action taken by the second communication client in response to receiving a session request with the additional information is generally related to the session being established between the first and second communication clients.

In one embodiment, the additional information is contextual information, which provides an association of people, issues, objects, events, files, tasks, archives of previous communications, and the like with the session being initiated. For example, the context indicia may be or may bear on a subject or topic with which people and documents are associated. In this example, assume the context information bears on a particular subject about which multiple people have exchanged email and multiple files have been shared and reviewed. The context information could be or could relate to the subject of the email, and when the second communication client receives the session request including the context indicia, certain actions may be taken to automatically exchange the most recent versions of the shared documents to all of the participants, and perhaps initiate additional sessions in an attempt to conference all of the parties related to that particular subject. Notably, the second communication client will recognize that the session request has the context indicia and make a determination regarding what action to take based on the context indicia. The context indicia may take many forms and cause numerous actions to be taken by the communication client receiving the session request. Further details and examples are provided later in the specification.

In another embodiment, the additional indicia provided in the session request may be specific instructions for the second communication client receiving the session request. As such, the second communication client may take action based on the instructions without having to determine what action to take based on the mere presence of context indicia. Notably, the additional information may include context indicia as well as instructions in other embodiments. The additional information may be the actual context indicia or instructions, or a pointer to appropriate information.

The actions taken by the second communication client upon receiving the additional information may take many forms, including displaying information, delivering information, initiating additional communication sessions, recording the communication session, storing information associated with the communication session, reacting in a certain fashion to session requests from third parties, and the like. Accordingly, the present invention relates to delivering additional information bearing on context indicia or instructions, and having the communication client receiving the session request take appropriate action in response to the context indicia or instructions.

Prior to delving into exemplary communication flows for delivering context indicia and instructions in a session request, an overview of an exemplary communication environment according to one embodiment of the present invention is provided. With reference to FIG. 1, an exemplary communication environment 10 is illustrated wherein communication clients 12 can communicate with each other and establish sessions for communication through a packet network 14. The sessions may be established using any type of session establishment protocol, such as the Session Initiation Protocol (SIP). The communication clients 12 may be implemented in various types of communication devices, such as personal computers, personal digital assistants (PDAs), telephones, and the like, and may be associated with one or more applications 16, which reside on or are otherwise closely associated with the communication client 12. Other applications 18 may be accessible by the communication client 12 via the packet network 14. These remote applications 18 may provide similar or different functions as the associated applications 16.

Depending on the communication protocol, communication servers 20 may be used to assist in establishing the sessions between the respective communication clients 12. These communication servers 20 may act as proxies, such as a SIP proxy, and play an important role in any necessary signaling or handshaking between the communication clients 12 prior to the communication session being established. Typically, but not necessarily, the communication session is established directly between the communication clients 12, even when session control signaling may involve the communication servers 20. Additionally, one or more media application servers 22 may be provided to assist in establishing various types of media sessions, such as voice, audio, and video sessions and associated conferencing between the communication clients 12 as well as third party communication clients (not shown).

For the purposes of illustration, the communication environment 10 is separated into two sides by a dashed line. Those entities on the left side of the dashed line will be modified by the term "sending" and those on the right side of the dashed line will be modified by the term "receiving." The use of the terms "sending" and "receiving" clarifies whether the devices are associated with the communication client 12 sending the session request or receiving the session request. Accordingly, the sending communication client 12 will send a session request to the receiving communication client 12 to initiate a communication session between the sending and receiving communication clients 12.

In general, the sending associated applications 16 and the sending remote applications 18 will provide the additional information, either context indicia or instructions, to the sending communication client 12, which will send a session request including the additional information to the receiving communication client 12. In addition to establishing the session with the sending communication client 12, the receiving communication client 12 will process the additional information and interact with the appropriate receiving associated application 16 or receiving remote application 18 to take the appropriate action based on the context indicia or instructions provided in the additional information. As noted, the receiving communication client 12 may also interact with the receiving media application server 22 as necessary to support actions involving various types of media-related functions.

When sending session related messages between the sending and receiving communication clients 12, the respective sending and receiving communication servers 20 may be used to route these messages. For example, a session request taking the form of a SIP Invite message may be sent from the sending communication client 12 to the sending communication server 20, which will forward the SIP Invite message to the receiving communication server 20, which will in turn forward the SIP Invite message to the receiving communication client 12. For the following communication flow diagrams, the routing of a session request through the communication servers 20 is not illustrated, for conciseness and readability. Those skilled in the art will recognize that various types of communication protocols may or may not require the routing of these session-related messages through the respective communication servers 20, and that the specific routing of these messages is not integral to the concepts of the present invention.

Figure 2:
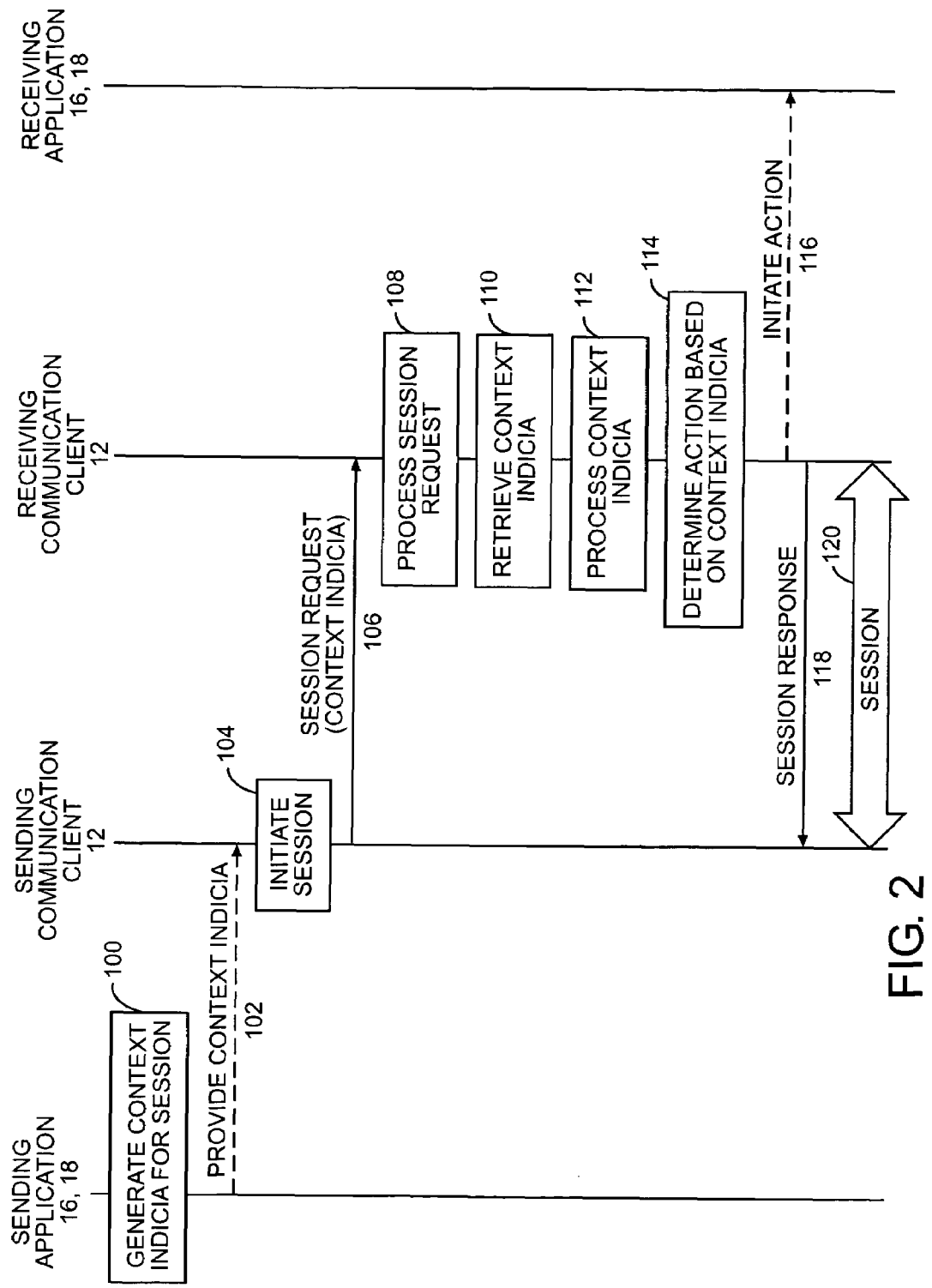
FIG. 2 is a communication flow diagram according to a first embodiment of the present invention.

Turning now to FIG. 2, an exemplary communication flow is provided where the additional information provided in the session request is context indicia. Initially, a sending associated or remote application 16, 18 will generate context indicia for an upcoming session between the sending and receiving communication clients 12 (step 100). The context indicia is provided to the sending communication client 12 (step 102), which will initiate the session (step 104) by sending a session request including the context indicia toward the receiving communication client 12 (step 106). Upon receipt of the session request, the receiving communication client 12 will process the session request (step 108), retrieve the context indicia from the session request (step 110), and process the context indicia (step 112). The receiving communication client 12 will use the context indicia to determine an action to take based on the context indicia (step 114), and initiate the action by communicating with the appropriate receiving application 16, 18 (step 116). The receiving communication client 12 may access information stored internally or externally to identify the relationships associated with the context indicia and determine the action to take based on the given context indicia. The receiving communication client 12 will send a session response back to the sending communication client 12 (step 118), which will establish a communication session between the sending and receiving communication clients 12 (step 120). Notably, the action may be initiated at any time before the session is initiated (as illustrated), while the session is being initiated, or after the session is initiated. The actual action may take place at any time as needed and may be optional based on various criteria.

The context indicia does not provide an instruction, but information that the receiving communication client 12 can process to determine an action to take. The context indicia identifies a relationship among people, issues, objects, events, files, tasks, archives of previous communications, and the like, and associates this relationship with the communication session. Based on the relationship, the receiving communication client 12 can determine an action to take, and must be configured to process context indicia to arrive at the proper action. For example, if the context is a meeting set on the calendars of a group of people, the action to take may be to establish communication sessions with the people scheduled to conference and distribute documents, web pages, links, or other files to all the people in the group. Alternatively, context indicia may relate to a certain project, wherein when the session is established, aspects of the project will be displayed to the respective users. The communication session may be recorded and information associated with the communication session and the communication itself may be stored as desired by the participants. Another example would be having the context indicia correspond to the subject of an email, wherein a copy of emails having the same subject are sent to the communication session participants or local copies of the emails are displayed for the participants. Notably, the session does not need to be a voice session, but could be an instant messaging session, a video conferencing session including voice, and the like. Thus, the context indicia may be used to identify interested parties, present participants with related information and documents, or trigger related communication events. The actions taken do not need to be immediate. For example, the receiving communication client 12 may recognize the context indicia as allowing additional parties related to the context indicia to join the session. Thus, when session requests arrive from parties having a relationship to the context indicia, the receiving communication client 12 may recognize these participants and allow them to join the session with the initial participants.

Again, the context indicia may identify the actual context, or provide a pointer to the actual context. In a SIP embodiment, the SIP Invite message will include a field in which the additional information containing the context indicia is provided. The receiving communication client 12 will review session requests to determine if this field is populated with additional information such as context indicia or instructions. The actions taken may also include automatically generating email, sending instant messages, and the like. Notably, the action is related to the context indicia and the communication session being established between the sending and receiving communication clients 12.

Figure 3:
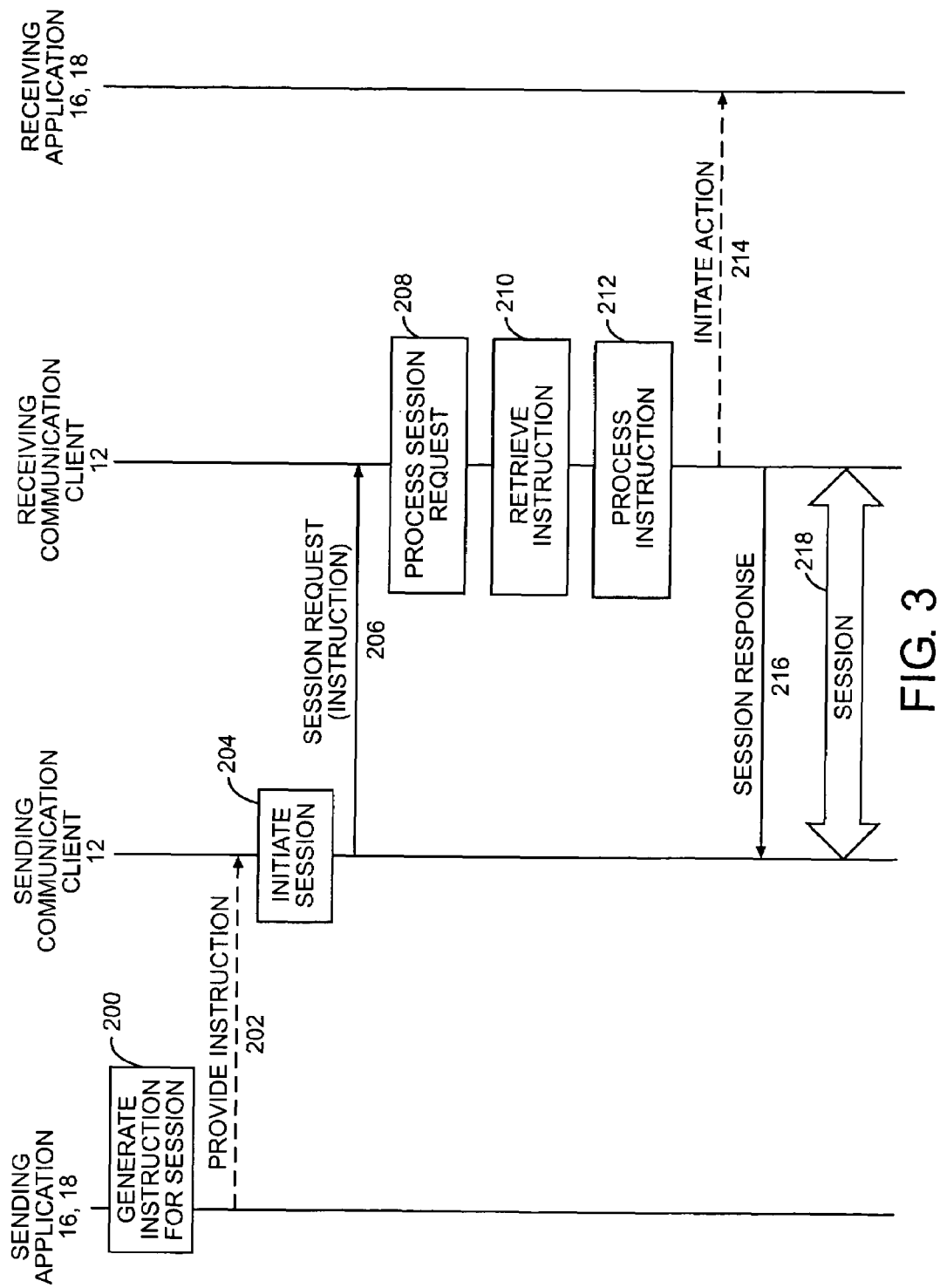
FIG. 3 is a communication flow diagram according to a second embodiment of the present invention.

Turning now to FIG. 3, a communication flow diagram is provided wherein the session request includes instructions for the receiving communication client 12. Initially, a sending application 16, 18 will generate an instruction for an upcoming session between the sending and receiving communication clients 12 (step 200). The instruction is provided to the sending communication client 12 (step 202), which will initiate the session (step 204) by sending a session request toward the receiving communication client 12 (step 206). The receiving communication client 12 will process the session request (step 208), retrieve the instruction (step 210), and process the instruction (step 212). As a result, the receiving communication client 12 will initiate an action in response to the instruction (step 214). Again, initiation of the action may take place before, during, or after session establishment. Further, the action may occur at any time. Initiating the action may involve instructing a receiving application 16, 18 to initiate a desired function. The receiving communication client 12 will also send a session response back to the sending communication client 12 (step 216) to establish the communication session between the sending and receiving communication clients 12 (step 218).

Various types of actions may be taken in response to the instruction; however, the action taken may relate to the session being established between the sending and receiving communication clients 12. Exemplary actions taken in response to the instruction are those described above in association with the context indicia. When the additional information is an instruction, the receiving communication client 12 need only be configured to properly interpret the instruction instead of analyzing the context indicia to determine an action to take.

Figure 4:
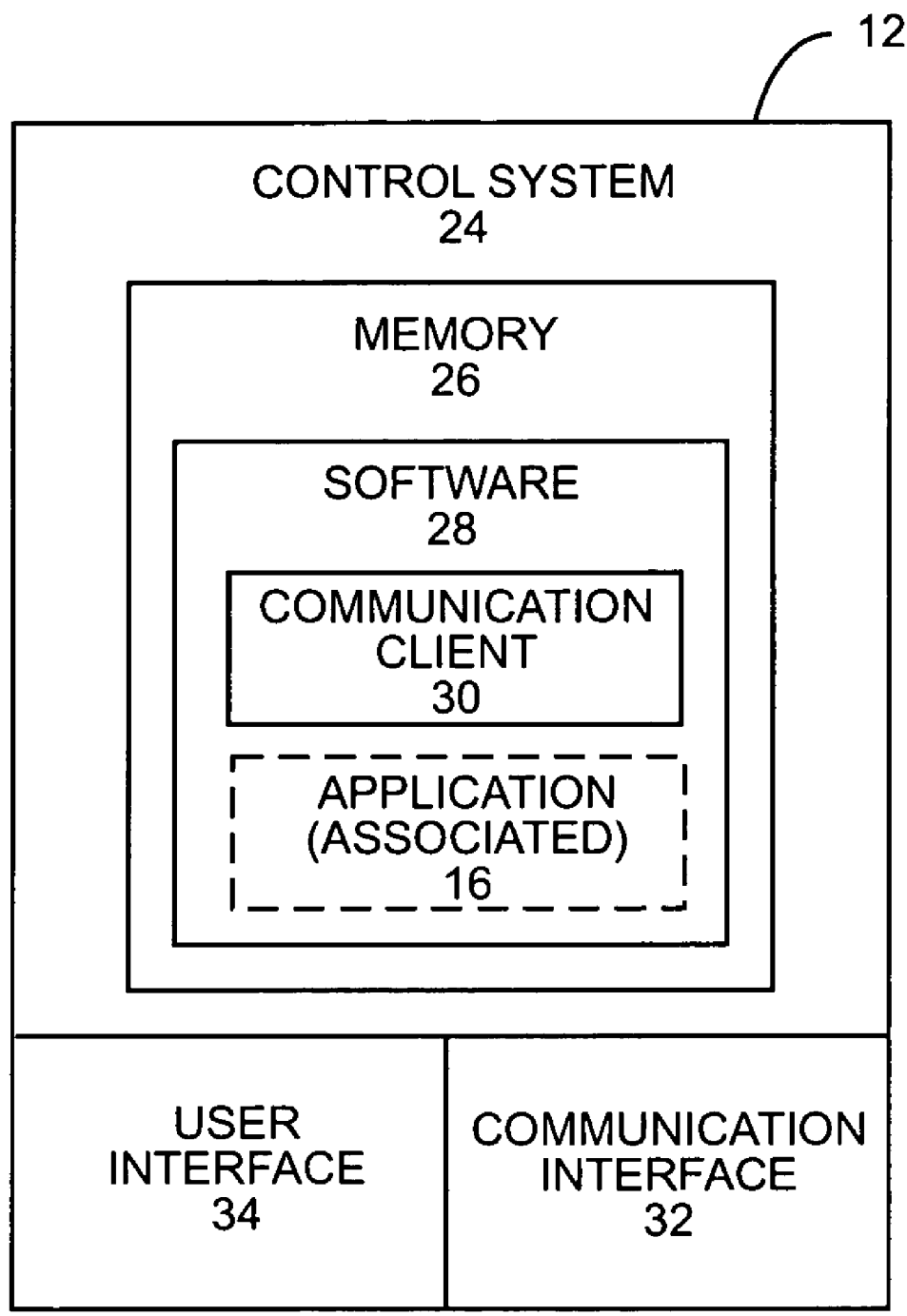
FIG. 4 is a block representation of a communication client according to one embodiment of the present invention.

With reference to FIG. 4, an exemplary communication client 12 is illustrated. The communication client 12 may include a control system 24, which is associated with memory 26 having sufficient software 28 to provide the functionality described above. In particular, the software 28 may include a communication client function 30 as well as one or more of the associated applications 16. The control system 24 is also associated with an appropriate communication interface 32 to facilitate sessions and any requisite signaling over the packet network 14. Further, the communication client 12 may include a user interface 34 through which user input is received and information may be displayed to the user. The communication interface 32 and the user interface 34 will vary depending on the nature of the communication client 12.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   a) receiving a session request originating from a sending communication client, the session request including information necessary to establish a communication session and additional information, where the additional information is different from the information necessary to establish the communication session;
   b) establishing the communication session with the sending communication client in response to the session request; and
   c) determining an action to take in association with the communication session based on the additional information.

2. The method of claim 1 wherein the additional information is context indicia.

3. The method of claim 2 wherein the context indicia identifies an association related to a subject matter of the communication session.

4. The method of claim 3 wherein the association is an association of people, information, or things.

5. The method of claim 2 wherein the context indicia identifies an association related to the action.

6. The method of claim 1 wherein the additional information is an instruction to take the action.

7. The method of claim 1 wherein the additional information comprises context indicia and an instruction to take the action.

8. The method of claim 1 further comprising initiating the action.

9. The method of claim 8 wherein the action comprises providing information to a user.

10. The method of claim 9 wherein the action comprises displaying the information to the user.

11. The method of claim 8 wherein the action comprises recording at least a portion of the communication session.

12. The method of claim 8 wherein the action comprises storing information related to the communication session.

13. The method of claim 8 wherein the action comprises initiating at least one communication session with a communication client other than the sending communication client.

14. The method of claim 13 wherein the action comprises creating a conference with the sending communication client and the communication client other than the sending communication client.

15. The method of claim 8 wherein the action comprises allowing only select communication clients to join the communication session.

16. The method of claim 8 wherein the action comprises obtaining information for at least one user participating in the session.

17. The method of claim 8 wherein the action comprises providing information for at least one user participating the session.

18. The method of claim 8 wherein the action comprises accessing a web site.

19. The method of claim 8 wherein the action comprises providing an email or instant message.

20. The method of claim 8 wherein the action comprises initiating a call.

21. The method of claim 8 wherein the action is initiated by sending a message instructing an application to take the action.

22. The method of claim 1, wherein the additional information is not used to establish the communication session.

23. A communication client comprising:
 a) a communication interface; and
 b) a control system associated with the communication interface and adapted to:
  i) receive a session request originating from a sending communication client, the session request including information necessary to establish a communication session and additional information, where the additional information is different from the information necessary to establish the communication session;
  ii) establish the communication session with the sending communication client in response to the session request; and
  iii) determine an action to take in association with the communication session based on the additional information.

24. The system of claim 23 wherein the additional information is context indicia.

25. The system of claim 24 wherein the context indicia identifies an association related to a subject matter of the communication session.

26. The system of claim 25 wherein the association is an association of people, information, or things.

27. The system of claim 24 wherein the context indicia identifies an association related to the action.

28. The system of claim 23 wherein the additional information is an instruction to take the action.

29. The system of claim 23 wherein the additional information comprises context indicia and an instruction to take the action.

30. The system of claim 23 wherein the control system is further adapted to initiate the action.

31. The system of claim 30 wherein the action comprises providing information to a user.

32. The system of claim 31 wherein the action comprises displaying the information to the user.

33. The system of claim 30 wherein the action comprises recording at least a portion of the communication session.

34. The system of claim 30 wherein the action comprises storing information related to the communication session.

35. The system of claim 30 wherein the action comprises initiating at least one communication session with a communication client other than the sending communication client.

36. The system of claim 35 wherein the action comprises creating a conference with the sending communication client and the communication client other than the sending communication client.

37. The system of claim 30 wherein the action comprises allowing only select communication clients to join the communication session.

38. The system of claim 30 wherein the action comprises obtaining information for at least one user participating in the session.

39. The system of claim 30 wherein the action comprises providing information for at least one user participating the session.

40. The system of claim 30 wherein the action comprises accessing a web site.

41. The system of claim 30 wherein the action comprises providing an email or instant message.

42. The system of claim 30 wherein the action comprises initiating a call.

43. The system of claim 30 wherein the action is initiated by sending a message instructing an application to take the action.

44. The system of claim 23, wherein the additional information is not used to establish the communication session.

* * * * *